(12) United States Patent
Kilibarda

(10) Patent No.: US 8,042,249 B2
(45) Date of Patent: Oct. 25, 2011

(54) MOTOR VEHICLE BODY ASSEMBLY APPARATUS

(75) Inventor: Velibor Kilibarda, Birmingham, MI (US)

(73) Assignee: Camau, Inc., Southfield, MI (US)

( * ) Notice: Subject to any disclaimer, the term of this patent is extended or adjusted under 35 U.S.C. 154(b) by 1340 days.

(21) Appl. No.: 11/602,760

(22) Filed: Nov. 21, 2006

(65) Prior Publication Data

US 2008/0084013 A1 Apr. 10, 2008

Related U.S. Application Data

(60) Provisional application No. 60/849,241, filed on Oct. 4, 2006.

(51) Int. Cl.
*B23P 11/00* (2006.01)

(52) U.S. Cl. ............ 29/430; 29/791; 29/792; 29/822; 29/823; 29/824; 901/1; 228/112.1

(58) Field of Classification Search .......... 29/430, 29/791, 792, 822, 823, 824; 901/5, 7, 18, 901/41, 42; 228/112.1
See application file for complete search history.

(56) References Cited

U.S. PATENT DOCUMENTS

| | | | |
|---|---|---|---|
| 4,442,335 A | 4/1984 | Rossi | |
| 4,799,581 A * | 1/1989 | Fujii | 198/341.03 |
| 5,174,488 A | 12/1992 | Alborante | |
| 5,186,304 A | 2/1993 | Kaczmarek et al. | |
| 5,400,944 A | 3/1995 | Zimmer et al. | 228/49.6 |
| 5,662,264 A | 9/1997 | Gustafsson et al. | |
| 5,974,643 A * | 11/1999 | Hays et al. | 29/39 |
| 6,008,471 A * | 12/1999 | Alborante | 219/158 |
| 6,036,082 A | 3/2000 | Caldarone | |
| 6,089,440 A | 7/2000 | Brusha | |
| 6,421,893 B1 | 7/2002 | Katayama et al. | |
| 6,708,867 B2 | 3/2004 | Yoshinaga | |
| 6,772,932 B1 | 8/2004 | Halstead | |
| 6,932,263 B2 | 8/2005 | Kilabarda et al. | |

FOREIGN PATENT DOCUMENTS

EP 1484131 A1 * 12/2004

* cited by examiner

*Primary Examiner* — Derris Banks
*Assistant Examiner* — Azm Parvez
(74) *Attorney, Agent, or Firm* — Young Basile

(57) ABSTRACT

A method and apparatus for providing motor vehicle sub-assemblies with unrestricted model mix and quick changeover between models. The apparatus includes a track; a carriage mounted for longitudinal movement along the track between first and second positions; and first and second turrets rotatably mounted on the carriage at longitudinally spaced locations and each including a plurality of circumferentially spaced individual faces and unique tooling fixtures on the respective faces for receiving unique work piece components corresponding to a plurality of motor vehicle body styles.

16 Claims, 5 Drawing Sheets

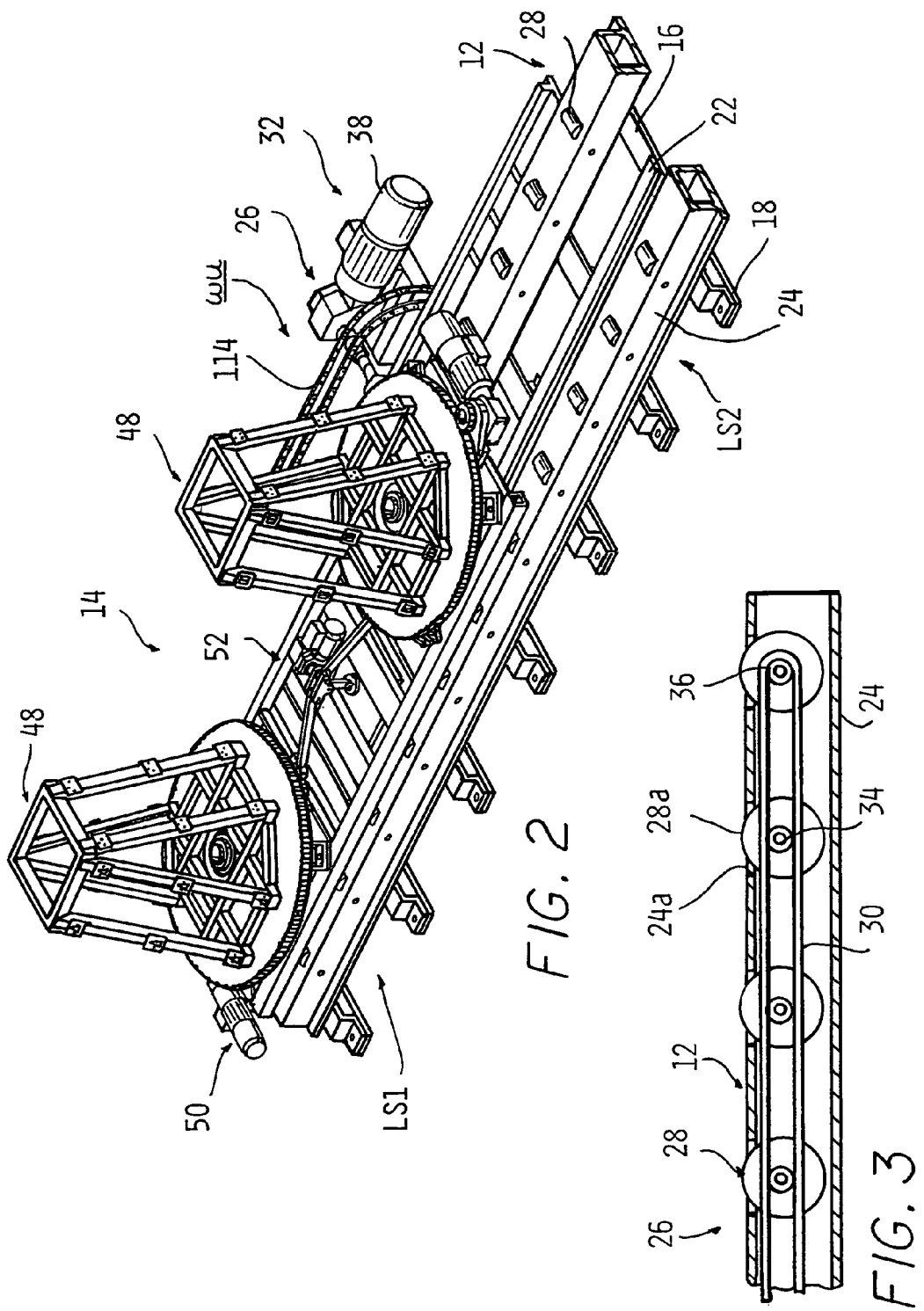

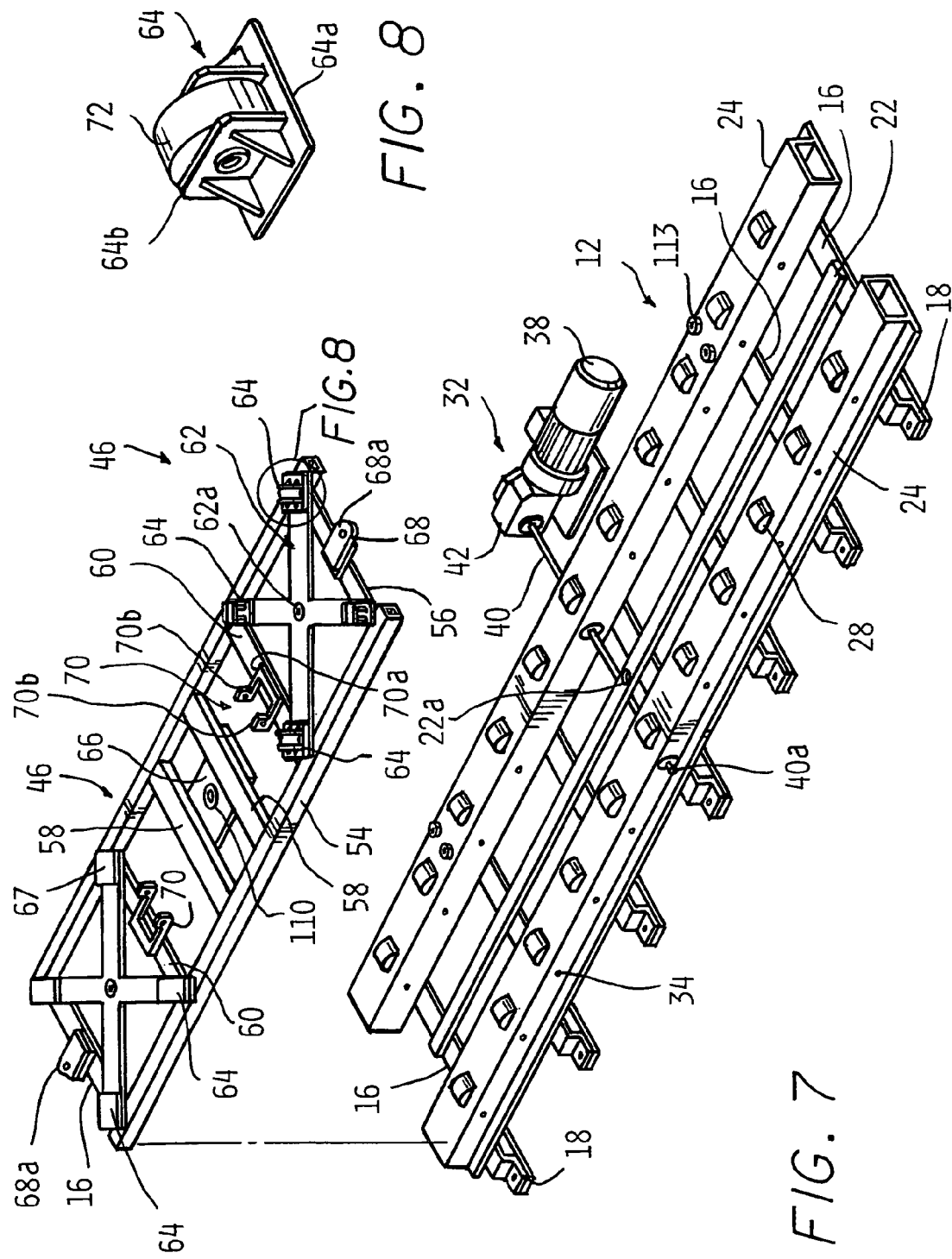

US 8,042,249 B2

MOTOR VEHICLE BODY ASSEMBLY APPARATUS

CROSS-REFERENCE TO RELATED APPLICATIONS

This application claims the priority of U.S. Provisional Patent Application Ser. No. 60/849,241 filed on Oct. 4, 2006, which is incorporated by reference herein in its entirety.

FIELD OF THE INVENTION

This invention relates to a motor vehicle body assembly, and more particularly to the formation and welding of motor vehicle body sub-assemblies with unrestricted model mix and quick changeover between models.

BACKGROUND OF THE INVENTION

A typical motor vehicle assembly plan is set up to produce several different body styles or models on the same assembly line. Each body style requires unique sub-assemblies and each sub-assembly requires unique end effector tooling. In the prior art, in order to change end effector tooling to effect a body style changeover at a sub-assembly location from a first model to a second model, robots are utilized to move the end effecter tooling corresponding to the first model from the sub-assembly location to a suitable storage location, all of the energy feeds for the tooling are decoupled, the robot picks up new tooling corresponding to the second model, the energy feeds of the new tooling are coupled to the robot, and the robot moves the new tooling to the sub-assembly location. This entire procedure is time consuming and inefficient especially in a random model mix assembly plant where the body style is frequently changed.

SUMMARY OF THE INVENTION

This invention is directed to the provision of a method and apparatus for providing motor vehicle sub-assemblies for a plurality of motor vehicle models with unrestricted model mix and quick changeover between models.

According to an important feature of the invention apparatus, the apparatus includes a turret having a central axis and first and second tooling faces spaced circumferentially about the central axis; unique tooling fixtures on the respective first and second faces for receiving unique work piece components corresponding respectively to the first and second motor vehicle body styles; and mounting structure mounting the turret for movement along a linear path between first and second work stations and for rotation about its central axis to selectively present a respective face and its unique tooling to a work station for receipt of unique work piece components corresponding to a respective motor vehicle body style.

According to a further feature of the invention apparatus, the first work station is defined on one side of the path; the second work station is defined on an opposite side of the path; and the apparatus further includes means operative to rotate the turret through 180° as the turret moves between the first and second work stations whereby to move a tooling face from a position presenting on one side of the path at the first work station to a position presenting on an opposite side of the path at the second work station. In one disclosed embodiment of the invention, the first work station comprises a loading station and the second work station comprises a welding station.

According to a further feature of the invention apparatus, the mounting structure includes a track, a carriage mounted for linear movement along the track, and journal structure on the carriage mounting the turret on the carriage for rotation about its central axis.

According to a further feature of the invention apparatus, the turret comprises a first turret and the apparatus further includes a second turret rotatably mounted on the carriage in longitudinally spaced relation to the first turret and including first and second tooling faces spaced circumferentially with respect to the rotational axis of the second turret and unique tooling fixtures on the respective first and second tooling faces of the second turret for receiving unique work piece components corresponding respectively to the first and second motor vehicle body style.

According to a further feature of the invention apparatus, the apparatus further includes power means operative to rotate each turret through 180° as the carriage is moved from its first position to its second position.

According to a further feature of the invention apparatus, the power means comprises a carriage motor assembly operative to move the carriage along the path between the first and second positions and turret motor assemblies mounted on the carriage and operative to rotate the turrets on the carriage.

According to a further feature of the invention apparatus, each turret includes a tower structure defining the first and second faces and a base ring gear positioned on the carriage and each turret motor assembly includes a motor driving a pinion engaging the ring gear of the respective turret.

According to a further feature of the invention apparatus, the track includes a plurality of longitudinally spaced rollers; the carriage is rollably mounted on the rollers; and the carriage motor assembly includes a motor driving the rollers whereby to propel the carriage along the track.

According to a further feature of the invention apparatus, the apparatus further includes a latch assembly mounted on the carriage and operative to selectively preclude sliding movement of the carriage along the track and rotation of the turrets on the carriage.

According to an important feature of the invention methodology, a turret is provided having a central axis and first and second tooling faces spaced circumferentially about the central axis; unique tooling fixtures are provided on the respective first and second faces for receiving unique work piece components corresponding respectively to first and second motor vehicle body styles; the turret is moved along a linear path between first and second work stations; and the turret is rotated about its central axis to selectively present a respective face and its unique tooling to a work station for receipt of unique work piece components corresponding to a respective motor vehicle body style.

According to a further feature of the invention methodology, the first work station is defined on one side of the path; the second work station is defined on an opposite side of the path; and the turret is rotated 180° as the turret moves between the first and second work stations whereby to move a tooling face from a position presenting on one side of the path at the first work station to a position presenting on an opposite side of the path at the second work station.

According to a further feature of the invention methodology, a track is provided extending between the first and second work station; a carriage is provided mounted for linear movement along the track; and journal means are provided on the carriage mounting the turret on the carriage for rotation about its central axis.

According to a further feature of the invention methodology, the turret comprises a first turret and the method includes the further steps of providing a second turret rotatably mounted on the carriage in longitudinally spaced relation to the first turret and including first and second tooling faces spaced circumferentially with respect to the rotational axis of the second turret and unique tooling fixtures on the respective first and second tooling faces of the second turret for receiving unique work piece components corresponding respectively to the first and second motor vehicle body style.

According to a further feature of the invention methodology, a path is provided having a load side and an unload side; a carriage is provided mounted for longitudinal movement along the path between a first position and a second position; first and second turrets are provided rotatably mounted on the carriage at longitudinally spaced locations on the carriage; first and second circumferentially spaced individual tooling faces are provided on each turret; unique tooling fixtures are provided on the respective first and second turret tooling faces for receiving unique work piece components corresponding to first and second motor vehicle body styles; the carriage is positioned in its first position with the first turret positioned with a first face thereof facing the load side of the path and the second turret positioned with the first face thereof facing the unload side of the path and work piece components corresponding to the first motor vehicle body style positioned on the first face thereof; work piece components corresponding to the first motor vehicle body style are loaded onto the tooling fixtures on the first side of the first turret while welding the work piece components corresponding to the first motor vehicle body style positioned on the first side of the second turret and thereafter removing the welded together work piece components from the second turret for further processing; and the carriage is thereafter moved to its second position while rotating the first turret to position the first face thereof facing the unload side of the path and rotating the second turret to position the first face thereof facing the load side of the path.

According to a further feature of the invention methodology, the method includes the further steps of, with the carriage in its second position, loading work piece components corresponding to the first motor vehicle body style onto the tooling fixtures on the first face of the second turret while welding the work piece components corresponding to the first motor vehicle body style positioned on the first face of the first turret and thereafter removing the welded together work piece components from the first turret for further processing.

According to a further feature of the invention methodology, the invention includes the further steps of, when a changeover to the second motor vehicle body style is required, rotating the first and second turrets to bring the second face of each carriage into the position corresponding to the position of the first face prior to the changeover.

According to a further feature of the invention methodology, each turret includes a third face circumferentially spaced from the first and second faces and unique tooling fixtures corresponding to a third motor vehicle body style are positioned on the third faces of the turrets whereby to allow changeover between the first and third body styles and the second and third body styles in addition to the changeover between the first and second body styles.

According to a further feature of the invention methodology, each turret further includes a fourth face circumferentially spaced from the first, second and third faces and unique tooling fixtures corresponding to a fourth motor vehicle body style are positioned on the fourth faces of the turrets whereby to allow changeover between the first and fourth body styles, the second and fourth body styles and the third and fourth body styles in addition to the changeovers between the first and second body styles, the first and third body styles and the second and third body styles.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 2 is a perspective view of the automotive body subassembly apparatus;

FIG. 3 is a fragmentary detail view of a power roll assembly utilized in the body subassembly apparatus;

FIG. 7 is an exploded perspective view showing a carriage and a track structure utilized in the body subassembly apparatus;

FIG. 8 is a perspective view of a roller turret guide assembly; and

DETAILED DESCRIPTION OF THE PREFERRED EMBODIMENTS

Figure 1:
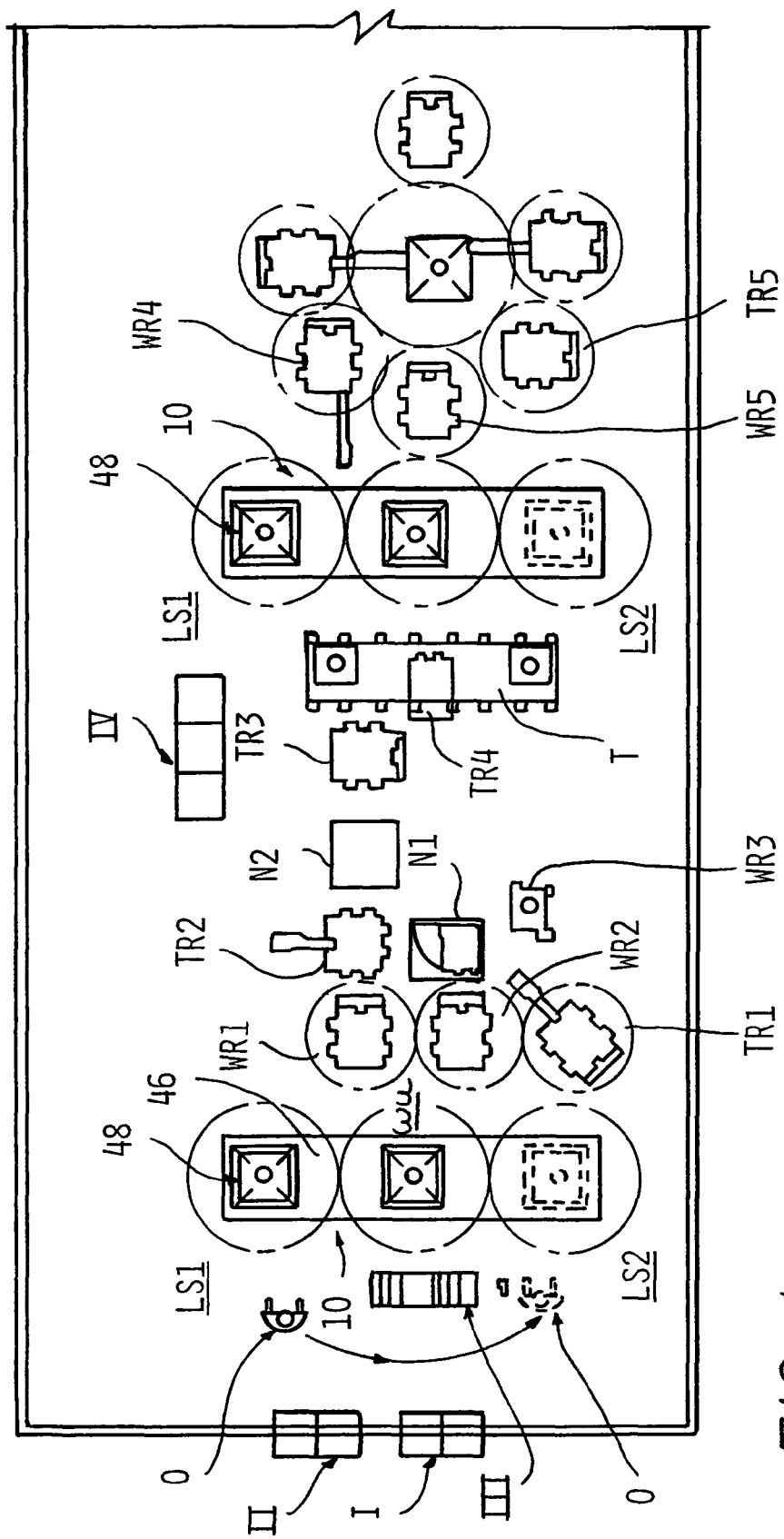
FIG. 1 is a schematic plan view of an automotive body assembly installation including an automotive body subassembly apparatus according to the invention.

The automobile body assembly installation seen in FIG. 1 is especially suited for use in fabricating automotive subassemblies such as doors, hoods, deck lids, cowls, etc.

An important part of the installation of FIG. 1 comprises an automotive body subassembly apparatus 10, two of which are seen in FIG. 1.

Each body subassembly apparatus 10, broadly considered, includes a track structure 12 and a shuttle assembly 14.

Track structure 12 includes a plurality of transverse longitudinally spaced cross members 16 supported at their opposite ends by foot pads 18 suitably secured to a floor surface 20; a central longitudinal spine member 22 interconnecting the cross members, a pair of tubular rail members 24 extending along opposite end edges of the cross members; and a power roll assembly 26.

Power roll assembly 26 includes a plurality of rollers 28, a plurality of drive elements 30, and a motor assembly 32.

Each roller 28 is journaled within a respective rail member 24 by a shaft 34 with an upper portion of the roller projecting through a window 24a in the rail member to position the upper peripheral face 28a of the roller above the upper face of the rail member. A series of rollers 28 are positioned in longitudinally spaced relation in each rail member 24.

Drive elements 30 may comprise belts or chains driving the rollers 28 via pulleys or sprockets 36 fixedly secured on the respective shafts 34.

Motor assembly 32 includes an electric motor 38 driving an output shaft 40 through a reduction gear mechanism 42. Shaft 40 extends through rail members 24, terminates in free end 40a, and serves to drive a central roller 28 in each of the series of the rollers in the respective rail members, whereby powered rotation of shaft 40 acts via drive elements 30 to rotate all of the rollers in both rail members in a direction corresponding to the direction of rotation of shaft 40.

Shuttle assembly 14 includes a pallet or carriage 46, a pair of turrets 48, a pair of turret motor assemblies 50, and a latch assembly 52.

Carriage 46 is sized to slide along track structure 12 on rollers 28 so as to effectively shuttle back and forth along the track structure.

Carriage 46 includes a pair of tubular rail members 54, laterally spaced by a distance corresponding to the lateral spacing of the rail members 24 so as to enable the rail members 54 to move rollably along the rollers 28 in the respective rail members 24; end cross members 56; central cross members 58; intermediate cross members 60; X structures 62 positioned between each respective set of end members 56 and intermediate members 60; turret roller guide structures 64; a guide plate 66 underlying central cross members 58; a motor mount structure 68 positioned centrally on each end cross member 56; and a latch guide structure 70 centrally positioned on each intermediate cross member 60.

Each roller guide structure 64 includes a base plate 64a, spaced upstanding lugs 64b, and a roller 72 journaled between the spaced lugs. A roller guide structure 64 is fixedly positioned on each distal end of each X structure 62 at the intersections of the guide rails 54, end rails 56, and intermediate rails 60 with the rotational axes of the rollers 72 on each X structure 62 intersecting at the center 62a of the X structure.

Each motor mount structure 68 includes a plurality of stacked plates including an upper lug plate 68a.

Each latch guide structure 70 includes a base portion 70a secured to a respective intermediate cross-member 60 and a pair of spaced lugs 70b.

Each turret 48 includes a base ring gear 74 and a tower structure 76 fixedly secured to an upper face of the ring gear.

Tower structure 76 has a truncated pyramidal configuration and includes an upper rectangular frame structure 76a, a lower lattice work base structure 76b, and a plurality of inwardly angled upstanding members 76c extending between the base structure 76b and the upper frame structure 76a. The described structure will be seen to define four upwardly angled rectangular turret faces A, B, C and D, with each face defined between a pair of spaced upright members 76c.

Each turret is mounted at the center 62a of a respective X structure 62 via a suitable bearing structure 80 journaling a central hub portion 74a of the respective ring gear with the underface of the rim 74b of the ring gear rollably guiding on the rollers 72 of the respective turret guide structures 64 whereby to allow free rotation of the turret on the carriage about the axis of the bearing 80.

Each turret motor assembly 50 comprises an electric motor 82, a reduction gearing 84, an output shaft 86, and a pinion gear 88 driven by the output shaft. The motor 50 is mounted on the end of a guide rail 54 with the reduction gearing 84 mounted beneath a respective lug plate 68a with the output shaft extending upwardly thorough the lug plate to position the pinion gear 88 above the lug plate face in meshing engagement with the gear teeth 76c of the respective ring gear of the respective turret whereby actuation of the motor 50 has the effect of rotating the respective turret about the axis of its central bearing structure 80.

Latch assembly 52 includes an electric motor 90, reduction gearing 92, an output shaft 94, a three pronged lever structure 96 driven by shaft 94, turret latch assemblies 98, and a carriage latch assembly 100.

Motor 90 and reduction gearing 92 are suitably mounted on central carriage cross-members 58.

Each turret latch assembly 98 includes a latch finger 102 pivotally mounted intermediate its ends on a pivot shaft 103 extending between the lugs 70b of a respective latch structure 70, and a link 104 pivotally mounted at an inboard end thereof to a prong 96a of the lever structure 96 and pivotally mounted at its outboard end to the lower end of a respective finger 102.

Carriage latch assembly 100 includes a plunger 106 and a link 108. Plunger 106 is received in a bushing 110 in plate 66 and coacts at its lower end 106a with an aperture 22a in track structure central spine member 22. Link 108 is pivotally connected at its lower end to the upper end of plunger 106 and pivotally connected at its upper end to prong 96b of the lever structure 96.

Figure 4:
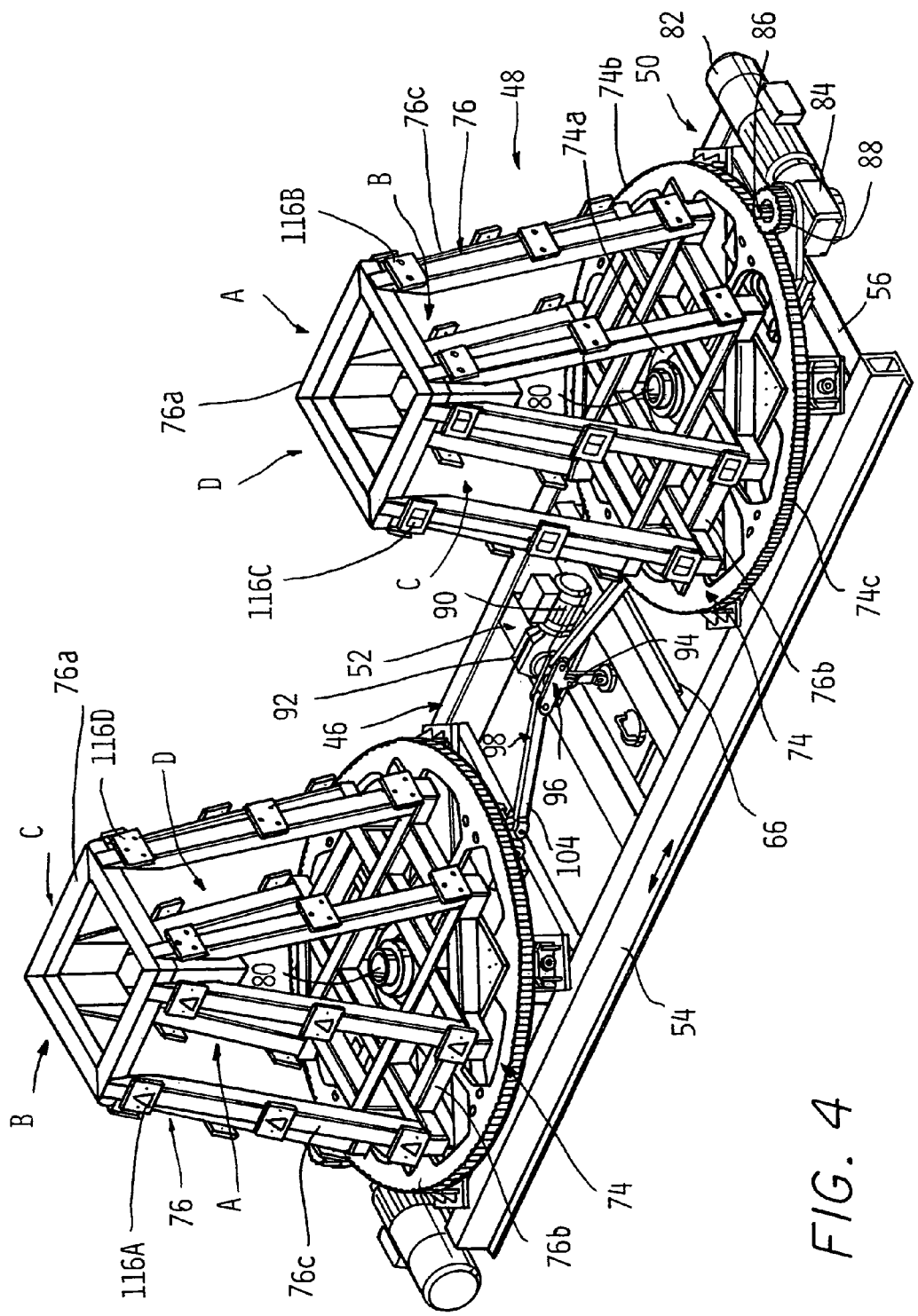
FIG. 4 is a perspective view of a shuttle assembly utilized in the body subassembly apparatus.
Figure 5:
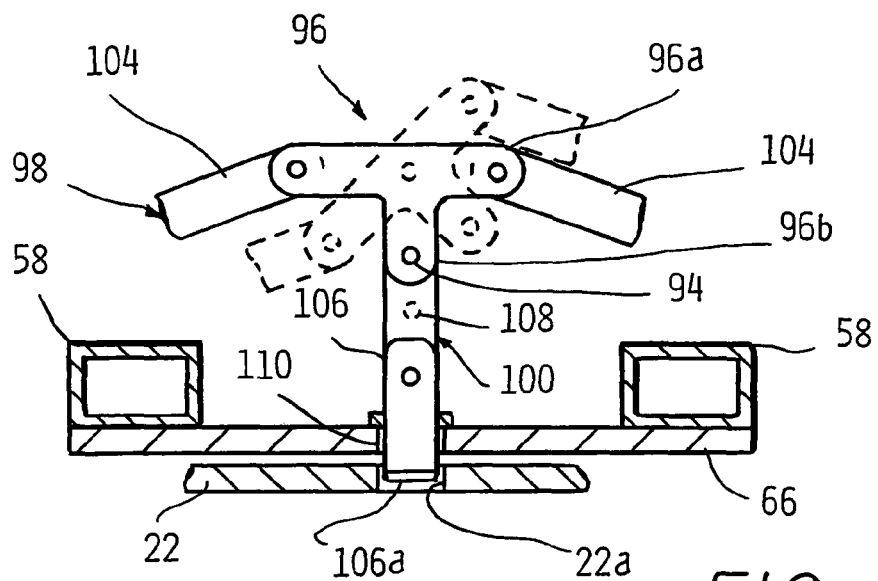
FIGS. 5 and 6 are detail views of a latch mechanism utilized in the shuttle assembly.
Figure 6:
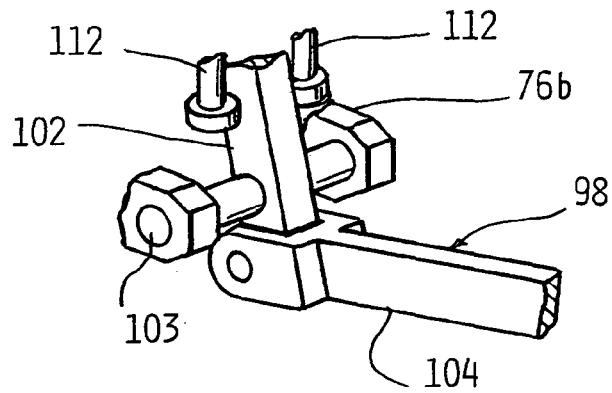
Figure 9:
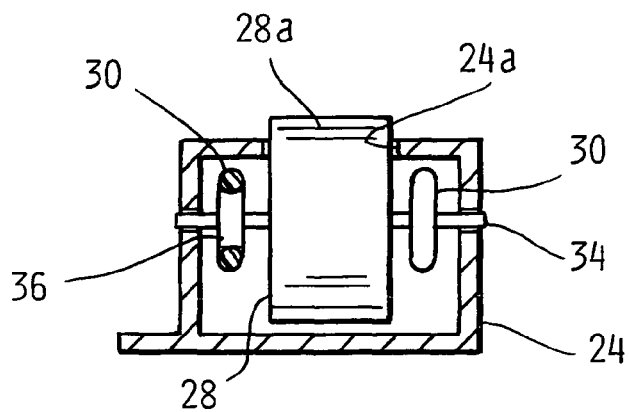
FIG. 9 is a cross-sectional view of the power roll assembly.

Latch assembly 52 is arranged such that with the latch elements in the position seen in FIG. 4, and in the solid line position of FIG. 5, the lower end 106a of plunger 106 engages aperture 22a in spine member 22 to preclude sliding movement of the shuttle assembly on the track structure and fingers 102 are positioned between rollers 112 down standing from the rim 74b of each ring gear 74 to preclude rotation of the turrets relative to the carriage 46.

When the latch lever 96 is rotated to the dash line position seen in FIG. 5 by suitable energization of motor 90, fingers 102 are rotated to a position clear of the rollers 112, whereby to allow free rotation of the turrets on the carriage, and the lower end 106a of plunger 106 is withdrawn from aperture 22a to allow sliding movement of the shuttle assembly on the track structure.

In overview, energization of motor 38 operates via rollers 28 and drive elements 30 to move the shuttle assembly longitudinally along the track structure, and energization of motors 82 acts via pinions 88 and ring gears 74 to rotate the turrets with respect to the carriage with the reciprocal or rotational movement selectively precluded or allowed by selective actuation of latch assembly 52. The reciprocal movement of the carriage along the track structure is facilitated by the rolling engagement of the side rails 54 of the carriage on the rollers 28 with lateral displacement of the carriage relative to the track structure precluded by guide rollers 113 suitably engaging the side rails of the carriage, and the rotation of the turrets on the carriage is facilitated by the bearing structures 80 and by the rolling engagement of the underface of the rim of the respective ring gear with the rollers 72. The amount of reciprocal movement imparted to the shuttle assembly as well as the amount of rotary movement imparted to the turrets is, in each case, controlled in known manner by encoder devices associated with the respective motors. Pneumatic, hydraulic, and electric energy requirements are delivered to the shuttle assembly by flexible conduits seen schematically at 114 and it will of course be understood that a suitable control mechanism will be provided to control the movements of the various components of the body subassembly apparatus 10 including the selective control of latch assembly 52 to selectively preclude and allow linear movement of the pallet and rotational movement of the turrets.

The operation of the body subassembly apparatus 10 in the context of the body assembly installation seen in FIG. 1 will now be described with attention first to the body subassembly apparatus 10 seen on the left side of FIG. 1.

The following description is on the assumption that the subassembly apparatus 10 will be utilized to perform the subassembly of a vehicle door and it will be understood that the four sides A, B, C and D of each turret have previously been outfitted with schematically illustrated tooling fixtures 116 (including clamps, risers, etc.) that are peculiar to a specific model of motor vehicle. Specifically, side A of each turret would be outfitted with fixtures 116A specific to the assembly of a door for a Model A vehicle; side B of each turret would be equipped with fixtures 116B specific to the assembly of a door for a Model B vehicle; side C of each turret would be equipped with fixtures 116C specific to the assembly of a door for a Model C vehicle; and side D of each turret would be equipped with fixtures 116D specific to the assembly of the door of a Model D vehicle. The Model A, B, C and D doors may comprise different doors for different body styles of the same basic vehicle and/or may comprise doors for totally distinct vehicles.

Assuming that it is desired initially to fabricate a door for a Model A vehicle, and with the shuttle assembly in the left position (as viewed in FIG. 2) with the A face of the left turret facing the operator "O" and the A face of the right turret facing weld robots WR1 and WR2, the operator "O" positioned at a load station LS1 for the left hand turret would load Model A door components from bins I, II and III onto the A Model tooling fixtures 116A positioned on the "A" face of the left turret whereafter the shuttle assembly would be moved to the right (as viewed in FIG. 2) to move the right turret to the right end of the track assembly to a load station LS2 for the right hand turret while moving the left turret to a weld/unload station WU at the center of the track assembly while simultaneously rotating the left turret through 180° so that the "A" face of the left hand turret as it arrives at the weld/unload station WU now faces weld robots WR1 and WR2. Simultaneously, as the right turret moves to the right end of the track assembly the right turret is rotated through 180° to present the "A" face of the turret assembly to the operator "O" who has now moved to load station LS2 so that, as robots WR1 and WR2 weld the "A" Model components positioned on the "A" face of the left hand turret, the operator "O" may load "A" Model components from bins I, II and III onto the "A" model tooling fixtures 116A positioned on the "A" face of the right hand turret whereupon, following the simultaneous loading of the "A" face of the right hand turret and welding of the components on the "A" face of the left hand turret, the welded door may be unloaded from the "A" face of the left hand turret by a transfer robot TR1 positioned proximate weld/unload station WU and the shuttle assembly may be moved to the left to return the left hand turret to load station LS1 and move the right hand turret to the weld/unload station WU while simultaneously rotating each turret through 180° so that as the left turret arrives at the load station LS1 the "A" face is again presented to the operator "O" (who has now returned to his initial position at LS1) and as the right turret arrives at the weld/unload station WU the "A" face is presented to the weld robots. This simultaneous shuttling, rotating, and unloading procedure is repeated in so long as the plant manufacturing requirements are calling for the manufacture of "A" Model doors.

However, in a random mix assembly process in a plant capable of manufacturing several vehicle models, it is frequently necessary to effect a change-over in the subassembly procedures so as to provide door assemblies for a different model, such for example as a Model "B" vehicle. With the invention subassembly apparatus, this change-over is quickly and efficiently accomplished by simply rotating the turrets, utilizing motor assemblies 50, through 90° whereby to present the "B" face of each turret with the 116B tooling fixtures to the operator as the left turret is loaded at load station LS1 and the right turret is loaded at load station LS2. Once the turrets have been readjusted by a simple 90° rotation to accommodate a Model "B" subassembly procedure, the previously described loading and welding procedure can be undertaken and continued so long as Model "B" door assemblies are called for. If and when Model "C" door assemblies are required, a further 90° adjusting rotation of the turret assemblies is performed and if and when Model "D" door sub-assemblies are required, a further 90° rotation of the turret assemblies is performed. If it is desired to change from an "A" Model door assembly to a "C" Model door assembly or from a "B" Model door assembly to a "D" Model door assembly this change-over is quickly and efficiently accomplished by a 180° rotation of the turrets.

In each case, after the robots WR1 and WR2 have completed their welding operation on the respective door components, the transfer robot TR1 is utilized to unload the welded door assembly from the turret and move it to a nest N1 where further welding on the door assembly may be provided by a weld robot WR3 located at a respot station, whereafter a transfer robot TR2 may be utilized to move the respotted door assembly to a further nest N2 whereafter a further transfer robot TR3 may be utilized to access a further door assembly part (such for example as an impact beam) from a bin IV, add it to the previously welded door assembly, and transfer the door assembly with the added impact beam to a further transfer robot TR4 mounted on a table "T" for reciprocal movement between left and right positions (or upper and lower as viewed in FIG. 1) so as to coact with a further body subassembly apparatus 10 seen on the right hand side of FIG. 1. In this case the transfer robot TR4 takes the place of the manual operator "O" associated with the left hand body subassembly apparatus 10 and moves back and forth on table "T" between left and right positions to selectively load the left hand turret of the right hand apparatus 10 and the right hand turret of the right hand apparatus 10 in the manual manner previously described with respect to the left hand apparatus 10 with the shuttle assembly moving back and forth between left and right load stations as previously described with respect to the manual operator and with the turrets rotating through 180° as the turrets undergo their shuttling movement so as to present components loaded for example on an "A" face of a turret by the robot TR4 to further weld robots WR4 and WR5 located at a central weld/unload station whereafter the welded door assembly may be unloaded by a transfer robot TR5 for movement to a further respot station where further weld robots may perform further welding on the door assembly.

As with the left hand manual load body subassembly apparatus 10, the turrets of the right hand robot load body subassembly apparatus 10 may be readily rotated through either 90° or 180° to quickly provide a change-over between a Model "A", Model "B", Model "C" or Model "D" random door requirement with the model change-over performed at the right hand robot load apparatus 10 of course corresponding in each case to the model change-over performed at the left hand manual load apparatus 10.

The invention body subassembly apparatus will be seen to provide a quick and efficient means of effecting a model change-over. Specifically, model change-over is accomplished with the invention apparatus simply by rotating the turrets through the required angular amount, as compared to prior art installations where it is required for the robot to pick up the tooling at the sub-assembly location, transport the tooling to a suitable storage location, decouple all of the energy feeds for the tooling, and then, in a separate time consuming operation, pick up a new end effecter tooling corresponding to the new model requirements, couple the energy needs of the new tooling to the robot, and transport the tooling to the sub-assembly location. The total time required to simply rotate the turrets of the invention apparatus is a fraction of the time required in the prior art installation to deposit and decouple the old end effecter tooling at a suitable storage location and pick up and couple a new end effecter tooling to accomplish the proper subassembly for the new model. The overall effect is that the cost of the machinery required to provide ready and efficient subassembly of various vehicle models on a random basis is significantly reduced both in terms of the cost of the initial equipment, the maintenance required on the equipment, and the space required in the plant facility to accommodate the equipment.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A motor vehicle body assembly apparatus comprising:
a carriage moveable along a linear path of travel;
a first turret mounted on the carriage, the first turret having a central axis and first and second tooling faces spaced circumferentially about the central axis;
unique tooling fixtures on the respective first turret first and second faces for receiving unique work piece components corresponding respectively to first and second motor vehicle body styles;
mounting structures engageable with the carriage for movement along the linear path between first and second workstations and for rotation of the first turret about its central axis to selectively present a respective face and its unique tooling to a workstation for receipt of unique workpiece components corresponding to a respective motor vehicle body style; and
the apparatus further includes a second turret rotatably mounted on the carriage in longitudinally spaced relation to the first turret and including first and second tooling faces spaced circumferentially with respect to a rotational axis of the second turret and unique tooling fixtures on the respective first and second tooling faces of the second turret for receiving unique workpiece components corresponding respectively to the first and second motor vehicle body styles.

2. A body assembly apparatus according to claim 1 wherein:
the first workstation is defined on one side of the path;
the second workstation is defined on an opposite side of the path;
the mounting structures are adapted to rotate the second turret about the rotational axis; and wherein
the mounting structure for rotation of at least one of the first and the second turret further includes a journal structure on the carriage operative to rotate the at least one of the first and the second turret through 180° as the turret moves between the first and second workstations whereby to move a tooling face from a position presenting on one side of the path at the first workstation to a position presenting on an opposite side of the path at the second workstation.

3. A body assembly apparatus according to claim 2 wherein the first workstation comprises a loading station and the second workstation comprises a welding station.

4. A body assembly apparatus according to claim 1 wherein the mounting structure for movement along the linear path includes a track supporting the carriage.

5. A body assembly apparatus according to claim 1 further comprising:
a guide structure defining the linear path of travel.

6. A body assembly apparatus according to claim 1 further comprising power means operative to rotate each turret through 180° as the carriage is moved from the first workstation to the second workstation.

7. An apparatus according to claim 6 wherein the power means comprises a carriage motor assembly operative to move the carriage along the path between the first and the second workstations and turret motor assemblies mounted on the carriage and operative to rotate the turrets on the carriage.

8. An apparatus according to claim 7 wherein:
each turret includes a tower structure defining the first and second faces and a base ring gear positioned on the carriage; and
each turret motor assembly includes a motor driving a pinion engaging the ring gear of the respective turret.

9. An apparatus according to claim 7 wherein:
the guide structure defining the path includes a track structure including a plurality of longitudinally spaced rollers;
the carriage is rollably mounted on the rollers; and
the carriage motor assembly includes a motor driving the rollers whereby to propel the carriage along the track.

10. An apparatus according to claim 9 wherein the apparatus further includes a latch assembly mounted on the carriage and operative to selectively preclude sliding movement of the carriage along the track and rotation of the turrets on the carriage.

11. A motor vehicle body assembly apparatus comprising:
a first turret having a central axis and first and second tooling faces spaced circumferentially about the central axis, unique tooling fixtures on the respective first and second faces for receiving unique work piece components corresponding respectively to first and second motor vehicle body styles;
mounting structures mounting the turret for movement along a linear path between first and second workstations and for rotation about its central axis to selectively present a respective face and its unique tooling to a workstation for receipt of unique workpiece components corresponding to a respective motor vehicle body style, wherein the mounting structures includes a track, a carriage mounted for linear movement on the track, and journal structure on the carriage mounting the turret on the carriage for rotation about its central axis; and
a second turret rotatably mounted on the carriage in longitudinally spaced relation to the first turret and including first and second tooling faces spaced circumferentially with respect to the rotational axis of the second turret and unique tooling fixtures on the respective first and second tooling faces of the second turret for receiving unique workpiece components corresponding respectively to the first and second motor vehicle body styles.

12. A motor vehicle body assembly apparatus comprising:
a guide structure defining a linear path, the guide structure having a track structure including a plurality of longitudinally spaced rollers;
a carriage rollably mounted on the track rollers for longitudinal movement along the path between a first workstation and a second workstation;
first and second turrets rotatably mounted on the carriage at longitudinally spaced locations on the carriage, each turret having a tower structure defining first and second circumferentially spaced individual faces and a base ring gear positioned on the carriage;
power means comprising:
a carriage motor assembly having a carriage motor operative to drive the track rollers to propel the carriage along the track between the carriage first and the second workstations; and turret motor assemblies mounted on the carriage, each assembly including a motor driving a pinion engaging the ring gear of the respective turret operative to rotate the turrets through 180 degrees on the carriage as the carriage is moved from the carriage first workstation to the second workstation; and unique tooling fixtures on the respective first and second turret faces for receiving unique work piece components corresponding to first and second motor vehicle body styles, wherein the carriage and power means are operative to selectively present the respective face and unique tooling to one of the carriage first workstations and second workstations along the path for receipt of unique workpiece components corresponding to a respective motor vehicle body style.

13. An apparatus according to claim 12 wherein the apparatus further includes a latch assembly mounted on the carriage and operative to selectively preclude sliding movement of the carriage along the track and rotation of the turrets on the carriage.

14. The apparatus of claim 11 wherein each turret includes a tower structure defining the first and second faces and a base ring gear positioned on the carriage.

15. The apparatus according to claim 14 further comprising a turret motor assembly connected to the carriage, the turret motor in driving engagement with a pinion engaging the ring gear of the respective turret to selectively rotate.

16. The apparatus according to claim 11 further comprises a carriage motor assembly operative to move the carriage along the path between the first and the second workstations.

* * * * *